United States Patent [19]
Fawcett, Jr.

[11] Patent Number: 5,414,771
[45] Date of Patent: May 9, 1995

[54] SYSTEM AND METHOD FOR THE CREATION OF RANDOM SEQUENCES AND FOR THE CRYPTOGRAPHIC PROTECTION OF COMMUNICATIONS

[75] Inventor: Kenneth J. Fawcett, Jr., Falls Church, Va.

[73] Assignee: MRJ, Inc., Oakton, Va.

[21] Appl. No.: 90,262

[22] Filed: Jul. 13, 1993

[51] Int. Cl.$^6$ .............................. H04L 9/24
[52] U.S. Cl. ...................... 380/44; 380/46; 380/47
[58] Field of Search .................. 380/47, 46, 44

[56] References Cited

U.S. PATENT DOCUMENTS

| | | | |
|---|---|---|---|
| 3,034,105 | 5/1962 | Hell et al. ................ | 380/47 |
| 4,145,568 | 3/1979 | Ehrat .................... | 380/47 |
| 4,179,663 | 12/1979 | Vasseur ................. | 380/47 |
| 4,200,770 | 4/1980 | Hellman et al. . | |
| 4,218,582 | 8/1980 | Hellman et al. . | |
| 4,405,829 | 9/1983 | Rivest et al. . | |
| 4,424,414 | 1/1984 | Hellman et al. . | |
| 4,853,962 | 8/1989 | Brockman ............. | 380/44 |
| 4,995,082 | 2/1991 | Schnorr . | |
| 5,231,668 | 7/1993 | Kravitz . | |

FOREIGN PATENT DOCUMENTS 1500126 2/1978 United Kingdom .................. 380/47

OTHER PUBLICATIONS

Paul Davies, "The Mind of GOD", p. 130 (1992, Simon & Schuster).
Denning, Dorothy E. R. "Cryptography and Data Security" p. 83 Jan. 1983.
Diffie et al., "New Directions in Crytography", *IEEE Transactions on Information Theory*, vol. IT-22, No. 6, pp. 644-654, (Nov. 1976).
Bennett et al., "Quantum Cryptography", *Scientific American*, 50-57, (Oct. 1992).
Rivest et al., "A Method for Obtaining Digital Signatures and Public-Key Cryptosystems", *Communications of the ACM*, vol. 26, No. 1, pp. 96-99, (Jan., 1983).
Federal Register, vol. 40, No. 52, pp. 12067-12250, Mar. 17, 1975.
(Handout)—"The Generation And Use Of Random Read-Only Memories", MRJ, Inc., pp. 1-9, Oct. 2, 1991.

*Primary Examiner*—Gilberto Barron, Jr.
*Attorney, Agent, or Firm*—Banner, Birch, McKie & Beckett

[57] ABSTRACT

A system and method for creating a random combinational sequence by combining random elemental sequences. Embodiments of the present invention contemplate that the combinational sequence can be combined with messages or any other type of information for encryption/decryption purposes. Embodiments of the present invention also contemplate the creation of the random elemental sequences.

19 Claims, 5 Drawing Sheets

SYSTEM AND METHOD FOR THE CREATION OF RANDOM SEQUENCES AND FOR THE CRYPTOGRAPHIC PROTECTION OF COMMUNICATIONS

BACKGROUND OF THE INVENTION

I. Field of the Invention

The present invention relates to a system and method for creating random sequences. More specifically, embodiments of the present invention relate to a system and method for combining two or more random elemental sequences to form a random combinational sequence. This combinational sequence can be used to encrypt or decrypt messages (or any other type of information). The present invention allows the elemental sequences to be efficiently utilized so that substantial amounts of combinational sequence can be created while at the same time precluding the combinational sequence from being decomposed into its constituent elemental sequences (from analysis of the combinational sequence). Embodiments of the present invention contemplate that the elemental sequences can be placed in the public domain and used without compromising the effective encrypting capability of the combinational sequence.

II. Related Art

Cryptography (the practice of encrypting and decrypting messages) probably dates back to shortly after man was first able to send written messages from person to person. The sender of the message would use some agreed-upon transformation (also in the receiver's possession) to encrypt the message before sending it to the receiver. The receiver would then use this transformation (hereafter referred to as a "key") to decrypt the message. This practice was particularly prevalent during times of conflict, when maintaining the secrecy of messages was a matter of life or death.

In recent years, messages (in, e.g., data, voice and video form) have been more and more frequently transmitted over wires and air waves. This mode of transmission makes messages more vulnerable to access by unauthorized persons, since the messages become accessible to anyone having the proper (and often easily obtainable) equipment. Since the rise of commercial espionage has led to much electronic snooping through these various message transmission corridors, the art of cryptography has become increasingly important.

Advances over the years in the development of complex and difficult-to-break encrypted messages have been closely followed by advances in code-breaking techniques, both of which owe much to the advancement of computational resources. This cycle has been fueled, of course, by the continued desires of unauthorized persons to read these messages. As a consequence, there has been a never-ending need to develop better ways to encrypt messages.

In general, an encrypted (i.e., enciphered) message is created by mathematically combining the original message with a key. When an encrypted message is received by the intended receiver, the receiver typically uses the same key to decrypt (i.e., decipher) the message (again, by some mathematical combination) as was used by the sender to encrypt it. Thus, the use of the term, "key" (that is, it "locks" and "unlocks" the message). Typically, the key is generated by some esoteric scheme.

To make an encrypted message secure, it is necessary to make the key with which the original message is combined as "random" as possible. In essence, the less the key comprises any discernable patterns, the greater its randomness. A feature of randomness of a sequence is that the value of a given character/digit in the sequence cannot be determined even with complete knowledge of the values of all other characters/digits in the sequence. One "cryptographic" definition of a random sequence is a sequence that has no measurable biases. That is, any such bias is much much smaller than the standard deviation of that distribution (the criterion becomes more severe as sequence length increases).

The degree of "randomness" in a sequence is often expressed in terms of its "entropy." This concept, which was borrowed from thermodynamics and first applied to communications in the 1940's by Claude Shannon of Bell Laboratories, is a measure of the disorder (that is, lack of organization and pattern) in a system. Consequently, the greater the degree of randomness in a sequence, the greater its entropy.

The efficient and rapid generation of "cryptographically random" (hereinafter "random") keys is an ongoing goal of cryptography. In generating these keys, complex, non-linear schemes are typically used. Such schemes can achieve a significant degree of efficiency (i.e., a relatively small amount of input is required to generate a relatively large output), but sacrifice randomness.

Obviously, whatever key is used to encrypt the message must also be in the possession of the receiver of the message so that it can be decrypted. Typically, the key is as long as the message being sent. Consequently, when persons are transmitting large amounts of message, then large amounts of key are required for the encryption/decryption process. Since it is vital that no key be reused in order to maintain the security of the encrypted message, new quantities of key must be continually generated. This is based upon the "one-time key" theory, which states that encrypting a message with a random key will yield a truly unbreakable encrypted message, but only if the key is used once. This is in contrast to the non-linear schemes mentioned above, since the one-time system sacrifices efficiency to produce a random key.

Transporting the key (or elemental sequences used to generate it) to each sending/receiving party is typically accomplished independently of the transmission of any messages. This is, of course, done so as not to compromise the secrecy of the messages (since divulgence of the key to unauthorized persons would compromise encryption). Thus, the step of distribution and subsequent protection of the key (or elemental sequences used to generate it) is both a logistic inconvenience as well as a possible source of compromise. For this reason, the ability for sending and receiving parties to independently generate the same long random key and minimize the distribution step would be advantageous.

Current non-linear techniques accomplish this by using a so-called Key Generator (KG) which uses much less information as input than is ultimately generated as key output (i.e., much "algorithmic compression"). This allows large quantities of key to be generated, but has the negative effect of generating only "pseudo-random" keys. These keys are defined as pseudo-random since, based upon the way they are generated, they inherently have embedded patterns (i.e., biases). Although these patterns may not be easily discernable (even by a creator of a KG) and are advertised as "defying analysis,"

such types of systems have historically been broken by the discovery of these patterns.

Even if reliable random sequences could be generated by a conventional KG device, there is still the problem of distributing (to each sender/receiver) the information to be used with the KG device to generate the same key for all parties involved. This problem could be minimized if the source(s) (that is, elemental sequences) from which keys were generated could be kept in the public domain. This would allow the senders/receivers to have independent access to a library of elemental sequences from which virtually unlimited amounts of random key could ultimately be created. Thus, all that senders/receivers would need to be agree upon is the elemental sequences that are to be used (rather than physically transferring the elemental sequences themselves) and the way that they are to be used.

SUMMARY OF THE INVENTION

The present invention overcomes the deficiencies discussed above by providing a system and method for creating random combinational sequences which can be used to encrypt and decrypt messages. These sequences are formed by reading elemental sequences from a plurality of media storage devices and combining these elemental sequences together to form the combinational sequence. More specifically, embodiments of the present invention contemplate creating combinational sequences by reading elemental sequences from two or more of the media storage devices starting at predefined starting points along each media storage device. Once the elemental sequences are read and combined to create a combinational sequence, embodiments of the present invention contemplate that elemental sequences from a different combination of media storage devices are then read in the same way.

The scheme mentioned above has a number of different advantages, including the ability to permit the media storage devices containing the elemental sequences to be placed in the public domain. It also permits an increased amount of random sequence (in the form of the combinational sequence) to be created from a finite amount of source (that is, a finite amount of elemental sequence). These and other advantages and features will be discussed in greater detail below.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE PREFERRED EMBODIMENTS

The present invention relates to a system and method for creating random sequences. More specifically, embodiments of the present invention relate to a system and method for combining two or more random elemental sequences to form a random combinational sequence. This combinational sequence can be used to encrypt or decrypt messages (or any other type of information). The present invention allows the elemental sequences to be efficiently utilized so that substantial amounts of combinational sequence can be created while at the same time precluding the combinational sequence from being decomposed into its constituent elemental sequences (from analysis of the combinational sequence). Embodiments of the present invention contemplate that the elemental sequences can be placed in the public domain and used without compromising the effective encrypting capability of the combinational sequence.

Figure 1:
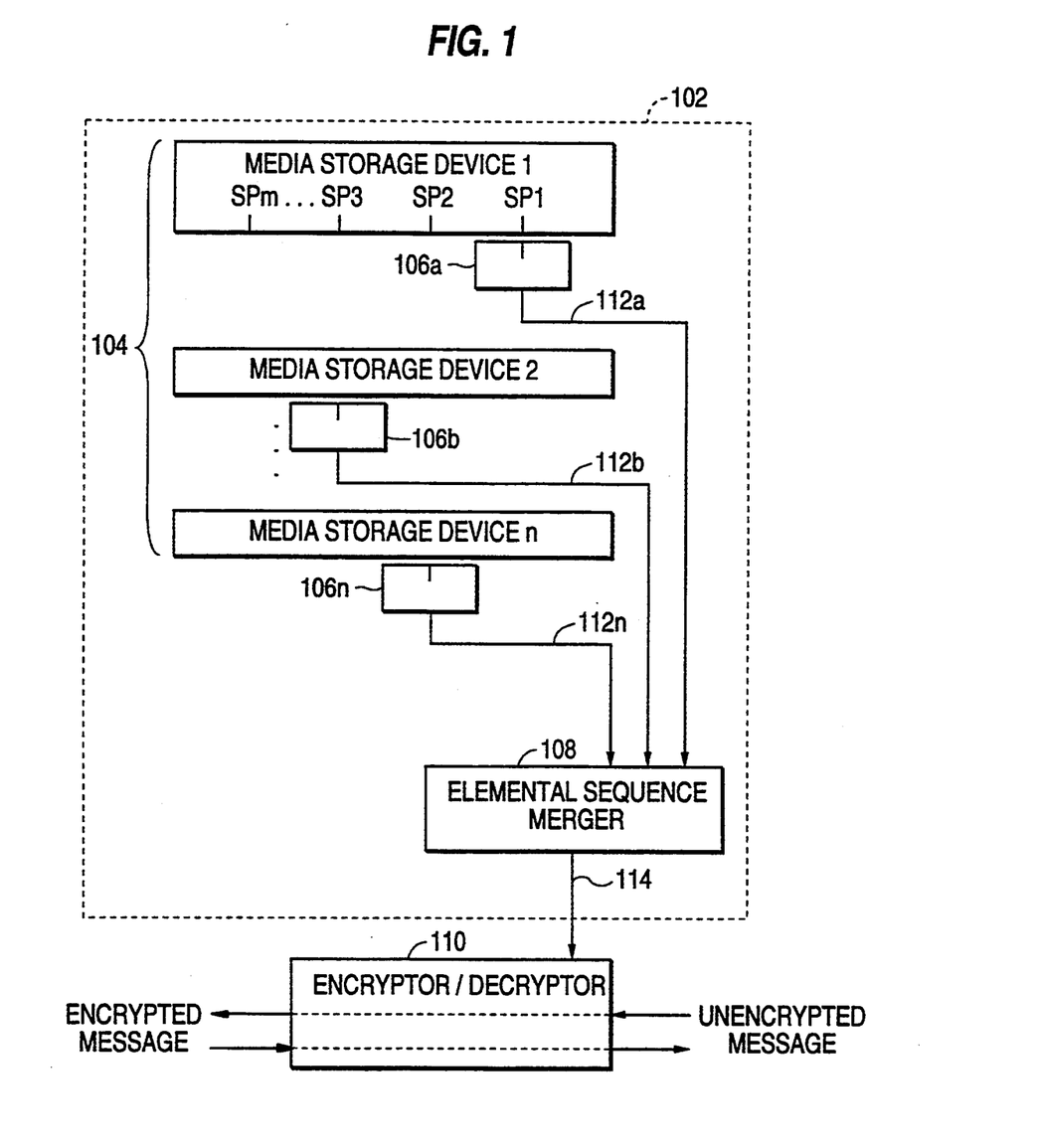
FIG. 1 is a block diagram of embodiments contemplated by the present invention for creating a combinational sequence and for encrypting/decrypting a message.

Embodiments of devices contemplated by the present invention for overcoming the deficiencies as mentioned in the Background Section are now explained with regard to FIG. 1. Referring to FIG. 1, a combinational sequence generator 102 is shown to contain n media storage devices 104 (where n is at least 2) each containing a random sequence. Each of the media storage devices 104 is further shown to be associated with a media reading device 106a–n. Some embodiments of the present invention contemplate that each of the n media storage devices 104 are chosen from a larger library of L media storage devices. Thus, in these embodiments, media storage devices 104 comprise a sub-library of the larger library L.

Embodiments of the present invention contemplate that the random sequence within each of the media storage devices 104 can be accessed at any of m (cyclically ordered) different starting points. Embodiments of the present invention contemplate that each of these m starting points are spaced in some irregular fashion. For example, media storage device 1 is shown having m accessible starting points, depicted as SP1, SP2, SP3... SPm. Each media reading device 106a–n can access its respective media storage device at any of these m points. In the example of FIG. 1, media reading device 106a is shown accessing media storage device 1 at SP1.

When reading portions of the random sequences of the media storage devices 104, embodiments of the present invention contemplate that the length of each elemental sequence accessed by the media reading devices 106a–n (to be combined together to form a combinational key) is the length of the entire random sequence (although lesser varying lengths could also be used). In other words, the entire random sequence is used as the elemental sequence. Thus, for example, assume that there are 3 media storage devices and 3 associated media reading devices and that media storage device 1 is read beginning at SP1, media storage device 2 is read beginning at SP6, and media storage device 3 is read beginning at SP4. SP1 then continues reading sequentially through SPm, SP6 continues reading sequentially (and cyclically) through SP5 and SP4 continues reading sequentially (and cyclically) through SP3. The entirety of each of these sequential readings constitutes an elemental sequence. For purposes of illustration, the entire contents of each media storage device is assumed hereinafter to be an elemental sequence, and is discussed as such below.

Some embodiments of the present invention contemplate that the number of starting points can be at least as numerous as the number of readable units (for example, bits). Ultimately, however, the size of the library L (which can be public or private), the number and capacity of media storage devices 104, the number of starting points SP and the length of the elemental sequences need to be sufficient to fulfill the particular application at issue and prevent the identity and the starting points of the elemental sequences from being illicitly obtained. For public libraries (i.e., where the media storage devices are available to the public), possible cryptographic attacks typically entail trial and error and/or linear algebraic manipulation/analysis of the elemental sequences. These issues will be discussed further below.

Embodiments of the present invention contemplate that the media storage devices 104 could be any type (or types) of storage device which allows access of discrete portions of the media. Such devices include, for example, optical media, magnetic media, and random access memories. Embodiments of the present invention also contemplate that the media storage devices 104 can each be partitioned to effectively contain more than one elemental sequence with their own starting points. Further, all of the elemental sequences could even be located on a single media storage device.

During the reading of elemental sequences from media storage devices 104, embodiments of the present invention contemplate that these elemental sequences are combined together to form a random combinational sequence. Although this combinational sequence can be used for any purpose requiring a random sequence, embodiments of the present invention contemplate that an important use is as a key for encrypting and decrypting information. Consequently, for purposes of illustration, the combinational sequence is hereinafter referred to as a combinational key.

In forming the combinational key, embodiments of the present invention contemplate that elemental sequences from at least two of the media storage devices 104 are received by an elemental sequence merger 108 via data paths 112a-n. The elemental sequences are combined in elemental sequence merger 108 to form the combinational key, which is then output via a data path 114. Some embodiments of the present invention contemplate that the elemental sequences are combined in elemental sequence merger 108 using linear techniques such as modulo two addition.

In embodiments of the present invention contemplating that the combinational key is used as a key to encrypt and decrypt messages, the combinational key is received from elemental sequence merger 108 via data path 114 and sent into an encryptor/decryptor 110. This encryptor/decryptor 110 encrypts and decrypts messages using the combinational key. Some embodiments of the present invention contemplate that the combinational key is combined with messages in the encryptor/decryptor 110 using linear techniques such as modulo two addition.

Embodiments of the present invention contemplate that the elemental sequence merger 108 can be implemented using any number of different techniques, including adder circuitry or software performing the same function within a computer. The same is true for encryptor/decryptor 110.

In embodiments where a message is encrypted by the present invention, it is contemplated that the encrypted message is transmitted (for example, via telephone lines or air waves) by a sender to a receiver who is also in possession of the present invention. Using the same media storage devices 104 and same sequence of starting points as the sender, the receiver creates the same combinational key that was used to encrypt the message. The receiver then uses this combinational key to decrypt the message.

The combinational key generated by elemental sequence merger 108 will have a level of entropy greater than or equal to that of the elemental sequences used to create it. (This is particularly beneficial for embodiments where the elemental sequences have a relatively low level of entropy for "privacy" applications, which require less security). Thus, since embodiments of the present invention contemplate that the elemental sequences themselves are assumed "random" as defined in the Background section, the combinational key is at least as "random" as the elemental sequences, and thus provides a key of greater or equal security than any individual elemental sequence. However, other significant benefits also result from combinational sequence generator 102, as will now be discussed.

The elegant design provided by embodiments of the present invention, some of which are depicted by FIG. 1, allows for a number of advantages. For example, embodiments of the present invention can operate securely in environments where the media storage devices 104 are in the public domain. This means that a combinational key derived from media storage devices 104 is not compromised by the fact that the media storage devices 104 are in the public domain. Thus, any message encrypted using such a combinational key is also not compromised.

The advantage mentioned above assumes that a multitude of media storage devices 104 containing "random" sequences are publically available for use (i.e., the size of library L is large) and that each media storage device can be accessed at a multitude of starting points. To most effectively avoid compromising the combinational key, embodiments of the present invention contemplate that two criteria must be satisfied. First, there must be at least as many possible starting positions in the library L of all potential media storage devices combined as there are pieces of information (for example, bits) in any one of the media storage devices 104. Thus, for example, let each media storage device contain a random sequence of 256,000 bits. Distributed evenly, this means that each storage device needs to be accessible in 256,000/L different locations. Doing this prevents a potential code breaker from constructing a 256,000-row linear code generator matrix containing all possible known elemental sequences (from any starting point) as rows in the attempt to exploit a partial knowledge (crib) of the combinational key. Thus, analysis of the combinational key will not yield its constituent known elemental sequences. Even where the media storage devices 104 are not public, this property is still advantageous.

The second criteria is that the number of possible media storage devices 104 and associated starting points used must be too large for cryptoanalytic attack of an encrypted message by trial and error. That is, there must be too many possible combinations of elemental sequences that may have been used to make up a combinational key. An example which is believed to be unsolvable in a "reasonable" amount of time by any existing technology or technology likely to exist in the near future is one using 4 media storage devices from a possible library (public or otherwise) of 1000 media storage devices. An elemental sequence would be read from each of the four media storage devices, wherein each media storage device has 4,800,000 (e.g., using 1000-bit segments of a CD ROM, on average) possible starting positions.

For the above parameters, the number of possible combinational keys that could be generated exceeds $2^{124}$. This means that if it takes a hypothetical code breaker only 1/15 billionth of a second to test 124+ bit segments of a particular combination of elemental sequences and if the testing of combinations continued for 15 billion years, less than one of every 3 billion possible combinations of elemental sequences would have been tried. This would make it extremely unlikely that the right media storage devices and starting points would be uncovered. Further, even if such a test were to be successful, it would provide no insight compromising any prior or subsequent encrypted message, since different combinations of media storage devices and/or starting points would be used.

For those embodiments of the present invention contemplating that the media storage devices 104 are in the public domain, the information that needs to be transferred between parties involved in the transmission of encrypted messages is nominal, and includes the designations of the specific media storage devices to be used by each party together with the designation of the starting points to be used for reading each elemental sequence. This transferred information is referred to as a "specific key" which, of course, must be physically secured if the subsequently encrypted transmission is to remain secure. The specific key can be transferred in any number of ways, including boot strapping in a prior encrypted transmission or encrypted by existing one-time systems. Of course, the present invention contemplates other schemes of transfer as well.

It may be instructive to further discuss the effect of using a library of public domain media storage devices as discussed above on maintaining the integrity of the encrypted message and on maintaining the secrecy of the specific media storage devices used to encrypt the message. To begin with, as indicated above, if the same enciphering key (regardless of how generated) is used more than once by direct combination (e.g., modulo two) with more than one message, then each message will be compromised. This is because the two encrypted messages can be aligned and summed to yield a "residue" exhibiting grossly non-random statistics. From this, the messages are easily read and the enciphering key easily determined.

The present invention avoids this problem by never directly encrypting more than one message using the same combinational key. However, embodiments of the present invention contemplate that each elemental sequence can be used multiple times, so long as a particular combination of elemental sequences (i.e., media storage devices) is not used more than once to generate a combinational key (although some embodiments of the present invention contemplate that the same combination can be used so long as the same starting points are not reused). Alignment of messages encrypted using the combinational key does not yield any of the elemental sequences since the existence of at least one other elemental sequence prevents a pattern from emerging. Also, comparison of the combinational key with a "public" elemental sequence will not identify whether that elemental sequence was used in the creation of the combinational key. In this way, the elemental sequences can remain in the public domain since their specific identity within a combinational key remains protected.

Now, it is noted that if the elemental sequences in a media storage devices 104 were each used individually to encrypt messages, then each elemental sequence could only be "safely" used once (since this would comprise a one-time system). However, since the present invention allows an elemental sequence to be combined with other elemental sequences, a particular elemental sequence can be used for as long as different combinations of elemental sequences can be made using that particular elemental sequence. Thus, an added advantage of the present invention is that the amount of combinational key that can be generated (through combining the elemental sequences) is much larger than the total amount of elemental sequences by themselves (i.e., uncombined). Thus, the present invention has the advantages of a conventional KG device (i.e., smaller amount of information can be distributed to senders/receivers to generate larger amounts of key) while also having the advantage of a one-time system (i.e., the key is random).

As previously mentioned, the present invention depends upon the elemental sequences within the media storage devices 104 being "random." The KG devices discussed in the Background Section are not truly random in nature, since their output capacity (in the form of quasi-random sequences) greatly exceeds their input capacity. In order to utilize truly random sequences, embodiments of the present invention contemplate that the elemental sequences of the media storage devices 104 are produced in a manner allowing for the input of larger amounts of information than is output (and eventually stored in the media storage devices 104). One example of a technique for doing this contemplated by embodiments of the present invention is shown by FIG. 2.

Figure 2:
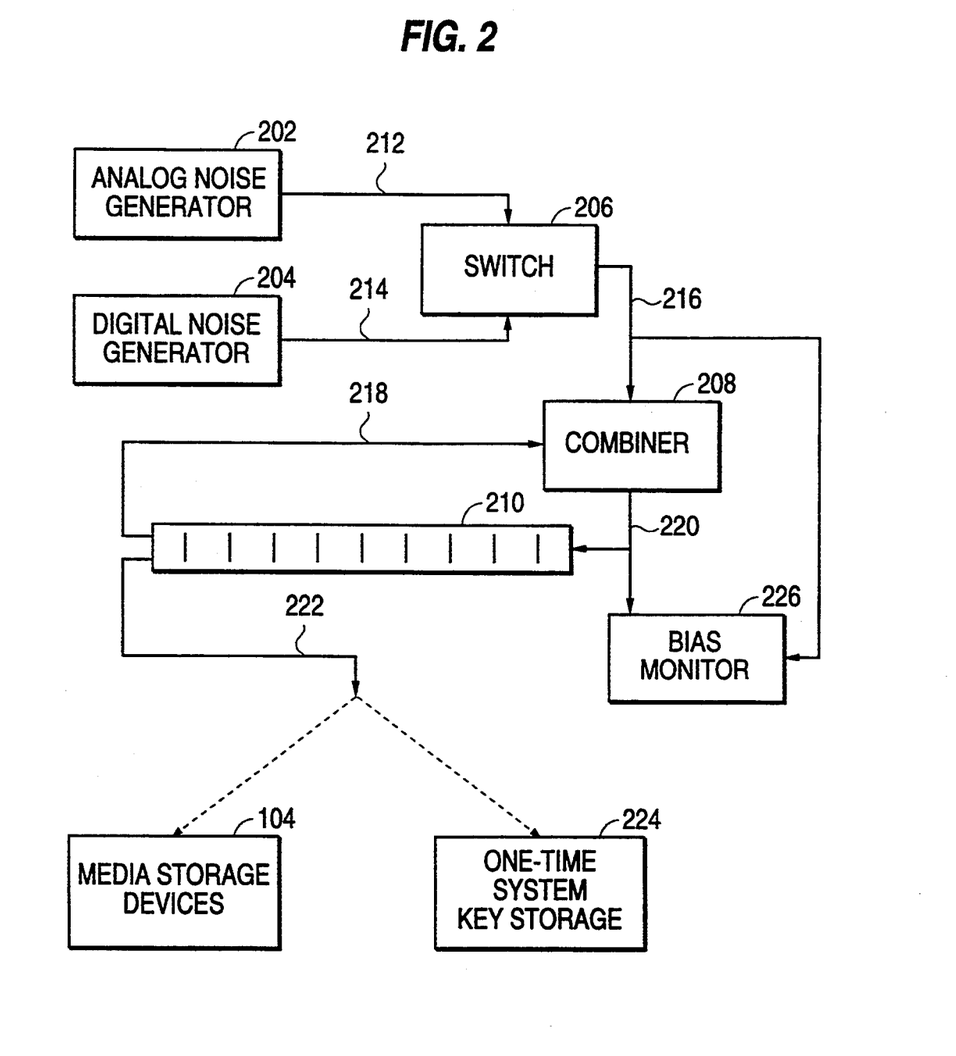
FIG. 2 is a block diagram of embodiments contemplated by the present invention for creating elemental sequences.

Referring now to FIG. 2, an analog noise generator 202 (contemplated to be connected to an analog-to-digital converter, not shown) and a digital noise generator 204 produce "noise" data which can be used as input to the remainder of the invention as shown. The output of either of these noise generators (both of which are contemplated to be quasi-random sequences) can be allowed to pass through switch 206 (although some embodiments contemplate that switch 206 is a combiner for combining the data of both noise generators). Embodiments of the present invention contemplate that the analog noise generator 202 could be a noise-generating diode such as an NC 204 manufactured by NOISE/COM of Paramus, N.J. and that the digital noise generator 204 could be any one or more readily-accessible sources of digital data, such as some compact disc technology (e.g., CD ROM). Although more than one analog noise generator 202 and digital noise generator 204 could be used, the present invention is not limited to these type of components or combinations thereof. Use of different types of components (e.g., analog and digital) can be implemented so that any subtle pattern that may exist in any one type of component can be eradicated by another type of component.

For the analog noise generator, embodiments of the present invention further contemplate an inefficient analog-to-digital conversion using below Nyquist sampling and discarding high-level significant bits. Four the digital noise generator 204, embodiments of the present invention contemplate an inefficient decimation of digital bytes and also discarding high-level significant bits. In any event, embodiments of the present invention contemplate that the source of the noise generated should be some certifiable physical phenomenon (i.e., something akin to the "fair" tossing of a "fair" coin). Further, anything generating apparently-random sequences (such as PN sequences) would be unsuitable for use. To ensure that any apparently-random sequences are not illicitly introduced into the system, some embodiments of the present invention contemplate that a short and private authentication (i.e., error-detecting) code be generated for each media storage device as a means of discouraging such counterfeit substitution.

Once the data passes through switch 206, it is received via a data path 216 by a combiner 208. At first, the combiner 208 merely writes the data it receives from switch 206 to a recirculating buffer 210 via a data path 220. Once the recirculating buffer 210 is full, the data within it is "recirculated" via a data path 218 and combined with new data from data path 216. Embodiments of the present invention contemplate that the combining function facilitated by the combiner 208 is modulo two addition.

Although the purpose of using noise generators 202 and 204 (and for possibly combining the data of these sources) is to minimize biases, the recirculating buffer 210 are typically needed to further reduce any noticeable biases that may still exist in the data received via data path 216. To determine whether these noticeable biases exist within the data, embodiments of the present invention contemplate that a bias monitor 226 samples both the data received via data path 216 and the data output from the combiner 208. Some embodiments contemplate that the information received by the bias monitor 226 is used to compute the number of recirculations that need to take place to reduce the biases to an acceptable level (so that the data will be "random") and then the bias monitor 226 samples the data in the recirculating buffer 210 after the recirculations have been completed. Of course, embodiments of the present invention also contemplate other schemes, such as sampling the data after each recirculation to determine whether the data is acceptable. Some embodiments also contemplate that the bias monitor 226 utilizes up/down counters or is functionally implemented in software.

Embodiments of the present invention contemplate that the bias monitor 226 can use a variety of schemes to determine whether the data in the recirculating buffer 210 is acceptably random. Some embodiments contemplate that the number of recirculating buffer cycles required to randomize the data in the recirculating buffer 210 can be given as follows:

Let the departure of the largest observed binary bias from its mean expected value be the variable $\epsilon_1$. For a coin with a 60% propensity of showing heads (or tails), for example, $\epsilon_1$ is equal to 0.10 (the difference between 0.60 and 0.50). Let the number of recirculation be the variable X. It can be shown that the resulting bias per bit, $\epsilon_x$, after X recirculations, is:

$$\epsilon_x = \frac{(2\epsilon_1)^x}{2} \quad \text{[equation 1]}$$

For example, after two recirculations (which combine two sequences) $\epsilon_2$ has been reduced to 0.02. The total bias evaluation for a sequence of b such bits is $b\epsilon_x$.

The expected distribution of b coin tosses is binomial where the mean is 50% ($\epsilon = 0$) and the standard deviation $\sigma$, is $b^{\frac{1}{2}}/2$. The stated criterion for one-time quality sequences is given by the equation:

$$b\epsilon_x = \frac{b(2\epsilon_1)^x}{2} << \frac{b^{\frac{1}{2}}}{2} \quad \text{[equation 2]}$$

Equation 2 reduces to the inequality:
$(2\epsilon_1)^x << b^{-\frac{1}{2}}$ [equation 3]
Let b be 4,800,000,000 bits (CD ROM capacity)
Let $\epsilon$ be 0.10 as above (60/40 bit bias)
Let X be 16 recirculations
Then equation 3 evaluates as below.

$$6.55 \times 10^{-12} << 1.44 \times 10^{-5} \quad \text{[equation 4]}$$

From which the expected (true) bias of the distribution is only 0.000 000 454 $\sigma$. Thus, given measurable bias el, the bias monitor 226 can predict the bias after X recirculations, and determine whether that bias would be acceptable (i.e., whether the resultant data would be "random"). If not, X can be incremented until an acceptable figure is obtained.

Once the contents of the recirculating buffer 210 have become "random," (as confirmed by bias monitor 226) they are then output via data path 222 to either media storage devices 104 or else stored for use in a one-time system, as indicated by a block 224. (In the latter situation, the information is then contemplated to be used only once.) Thus, the data on data path 222 is a random sequence. In both situations, the data needs to be copied and forwarded to the senders/receivers.

Some embodiments of the present invention contemplate that the media storage devices 104 themselves could be standard (non-random) off-the-shelf media devices such as compact discs, hard disk drives, etc. This would allow a typical user easier access to a large commercial library of media storage devices for utilizing combinational sequence generator 102. However, the quality of the combinational key generated might not be of a truly "random" nature, and these embodiments are thus contemplated where "privacy" rather than strict crypto security is desired.

Figure 3:
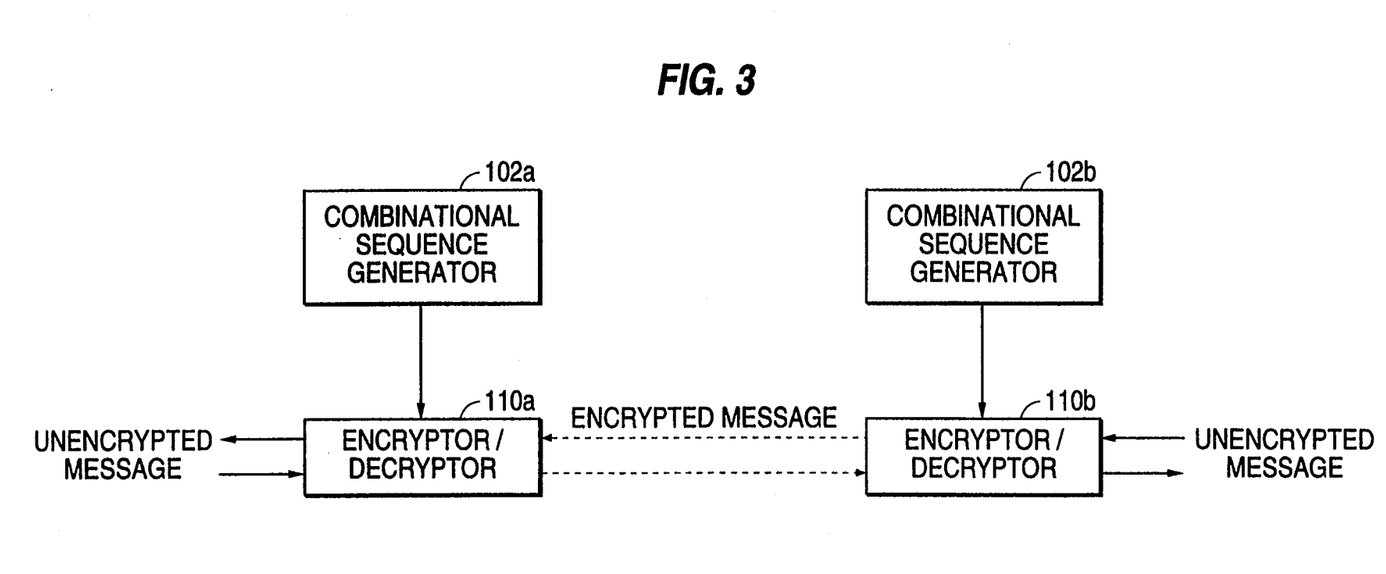
FIG. 3 is a block diagram depicting a contemplated use of the present invention of encrypting, transmitting, receiving and decrypting messages.

As indicated above, some embodiments of the present invention contemplate that the created combinational key is used to encrypt and decrypt messages sent between communicating parties. Such embodiments are depicted in use with regard to FIG. 3. Referring to FIG. 3, each communicating party has a combinational sequence generator (102a and 102b) as shown. Each party is assumed to be using the same media storage devices 104 and the same sequence of starting positions. In this way, all parties will create the same combinational key.

As an example of the application of the device shown in FIG. 3, assume a message of 100,000 bytes needs to be transferred by a sender. This requires 100,000 bytes of combinational key (created by combinational sequence generator 102a) to encrypt the message using an encryptor/decryptor 110a. The encrypted message then gets transferred to a receiving encryptor/decryptor 110b, which uses the same 100,000 bytes of combinational key (created by combinational sequence generator 102a) to decrypt the message.

In addition to sending and receiving messages from one party to another, embodiments of the present invention also contemplate that the combinational keys can be used for other purposes. For example, they can be used in encryption and decryption of computer information generally. More specifically, confidential databases can be encrypted and decrypted using the present invention. In addition, embodiments of the present invention contemplate that the elemental keys can even be stored in the same data base.

Figure 4A:
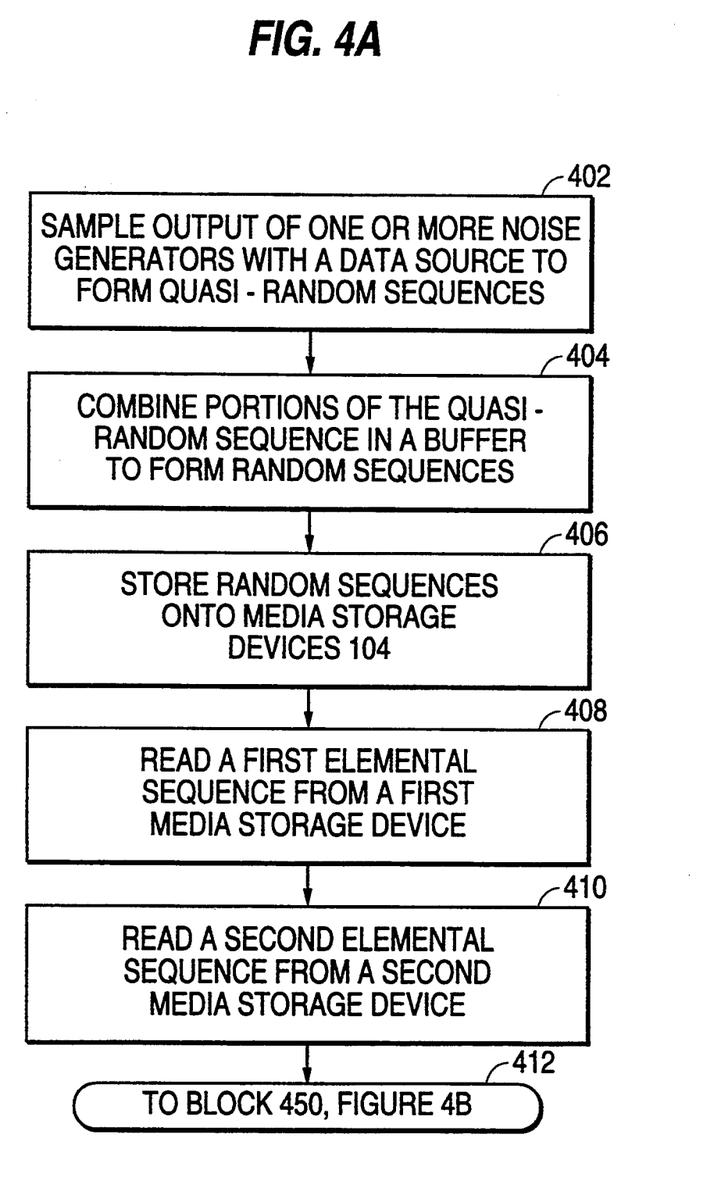
FIGS. 4A and 4B are flow diagrams of a method contemplated by embodiments of the present invention for creating elemental sequences and creating a combinational sequence and for encrypting/decrypting a message.
Figure 4B:
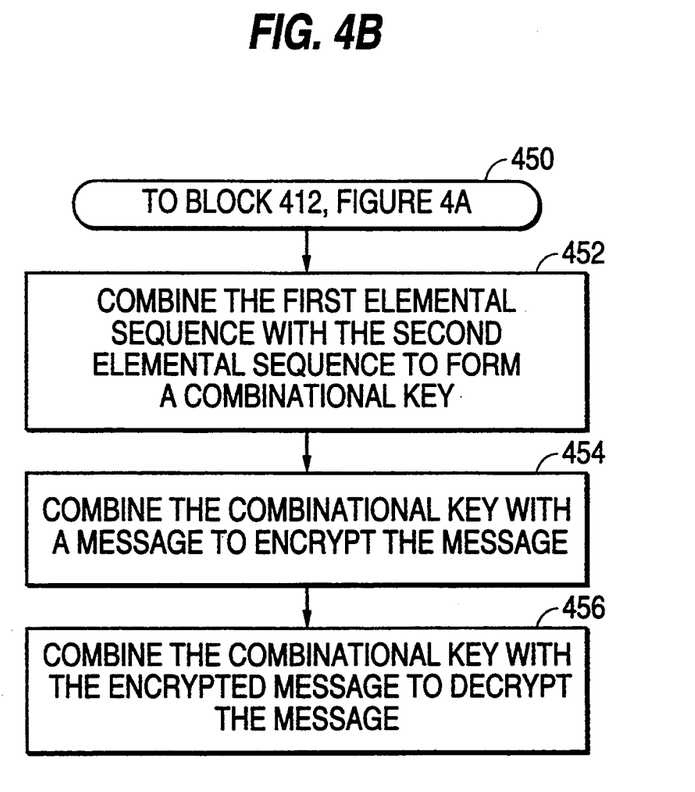

Embodiments of a method of operation of the present invention are now described using the flow chart of FIGS. 4A and 4B. Referring first to FIG. 4A, the first step is to sample the output of one or more noise generators to form quasi-random sequences. This is indicated by a block 402. These quasi-random sequences are then combined into a recirculating buffer to form random sequences. This is indicated by a block 404. These random sequences are then stored onto media storage devices 104 (and copied as required) as indicated by a block 406.

Some embodiments of the present invention contemplate that these random sequences are used for a one-time system. Other embodiments contemplate using the random sequences in subsequent steps, beginning (for example) with the step of reading a first elemental sequence from a first media storage device, as indicated by a block 408. A second elemental sequence is then read from a second media storage device, as indicated by a block 410.

Referring now to FIG. 4B, the next step contemplated by embodiments of the present invention is combining the first elemental sequence with the second elemental sequence to form a combinational key. This is indicated by a block 452. The next step is to combine the combinational key with a message which is to be encrypted. This is indicated by a block 454. Then, once the message is sent and then received by the appropriate person, the combinational key (having been generated by that person) is used to decrypt the message. This is indicated by a block 456.

It should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

It should also be understood that the present invention is not limited to the embodiments indicated above, and that the examples presented above are merely for the purposes of illustration. The scope of the present invention should therefore be interpreted by the following claims as defined by the forgoing figures and text.

What is claimed is:

1. A system for creating a combinational sequence, comprising:
   two or more media storage means for storing elemental sequences, each of said two or more media storage means being accessable from a plurality of starting points;
   media reading means for reading a selected portion from each of at least two of said two or more media storage means,
   wherein each said selected portion is accessed from a specified one of said plurality of starting points; and
   combinational sequence generation means for combining each said selected portion to form a combinational sequence,
   said combinational sequence forming a random sequence.

2. The system of claim 1, wherein said media reading means sequentially read each of said two or more media storage means beginning from pre-defined starting points to form said combinational sequence.

3. The system of claim 1, wherein said combinational sequence generation means combines each said selected portion using modulo two addition.

4. The system of claim 1, wherein said media storage means utilizes compact disc technology.

5. A system for generating a combinational sequence, comprising:
   quasi-random sequence generating means for generating quasi-random sequences;
   randomization means for receiving said quasi-random sequences and for additively forming random elemental sequences;
   two or more media storage means for receiving and storing said random elemental sequences from said randomization means;
   media reading means for reading a selected portion from at least two of said two or more media storage means; and
   combinational sequence generation means for combining each said selected portion to form a combinational sequence,
   said combinational sequence forming a random sequence.

6. The system of claim 5, wherein said quasi-random sequence generating means comprise one or more data generators for generating quasi-random data, and wherein said quasi-random data generated by said one or more data generators are combined.

7. The system of claim 5, wherein said quasi-random sequence generating means comprises at least one noise generating device.

8. The system of claim 7, wherein said noise generating device is a noise generating diode.

9. A system for encrypting and decrypting information, comprising:
   two or more media storage means for storing random elemental sequences, each of said two or more media storage means being accessable from a plurality of starting points;
   media reading means for reading a selected portion from at least two of said two or more media storage means,
   wherein each said selected portion is accessed from a specified one of said plurality of starting points;
   combinational key generation means for combining each said selected portion to form a combinational key,
   said combinational key forming a random sequence;
   encryptor/decryptor means for encrypting and decrypting the information combining said combinational key with the information.

10. The system of claim 9, wherein the information is encrypted and decrypted by said encryptor/decryptor means using modulo two addition.

11. The system of claim 9, wherein said media reading means sequentially read each of said two or more media storage means beginning from pre-defined starting points to form said combinational sequence.

12. The system of claim 9, wherein said combinational key generation means combines each said selected portion using modulo two addition.

13. A system for encrypting and decrypting information, comprising:

two or more media storage means for storing quasi-random elemental sequences, each of said two or more media storage means being accessable from a plurality of starting points;

media reading means for reading a selected portion from at least two of said two or more media storage means, wherein each said selected portion is accessed from a specified one of said plurality of starting points;

combinational key generation means for combining each said selected portion to form a key, said key forming a quasi-random sequence;

encryptor/decryptor means for encrypting and decrypting the information by combining said quasi-random key with the information.

14. The system of claim 13, wherein said media storage means utilizes compact disc technology.

15. A system for generating a combinational sequence, comprising:

quasi random sequence generating means for generating quasi-random sequences;

randomization means for receiving said quasi-random sequences and for additively forming random elemental sequences;

two or more media storage means for receiving and storing said random elemental sequences from said randomization means;

media reading means for sequentially reading said two or more media storage means; and combinational sequence generation means for combining each of said two or more media storage means to form a combinational sequence, said combinational sequence forming a random sequence.

16. The system of claim 15, wherein said quasi-random sequence generating means comprise one or more data generators for generating quasi-random data, and wherein said quasi-random data generated by said one or more data generators are combined.

17. The system of claim 15, wherein said quasi-random sequence generating means comprises at least one noise generating device.

18. The system of claim 17, wherein said noise generating device is a noise generating diode.

19. A method for creating a combinational sequence, comprising the steps of:

(a) storing random elemental sequences on two or more media storage means, each of said two or more media storage means being accessable from a plurality of starting points;

(b) reading a selected portion from at least two of said two or more media storage means, wherein each said selected portion is accessed from a specified one of said plurality of starting points; and (c) combining each said selected portion to form a combinational sequence, said combinational sequence forming a random sequence.

* * * * *